United States Patent Office 3,048,923
Patented Aug. 14, 1962

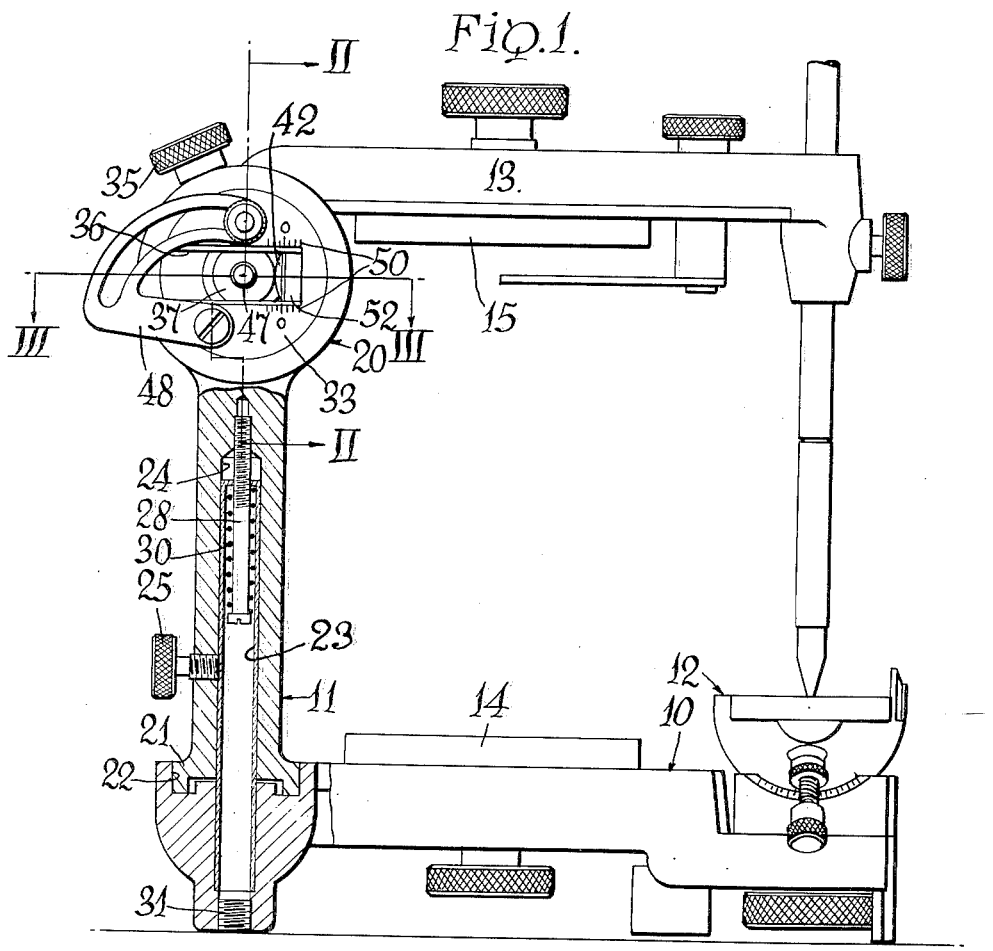
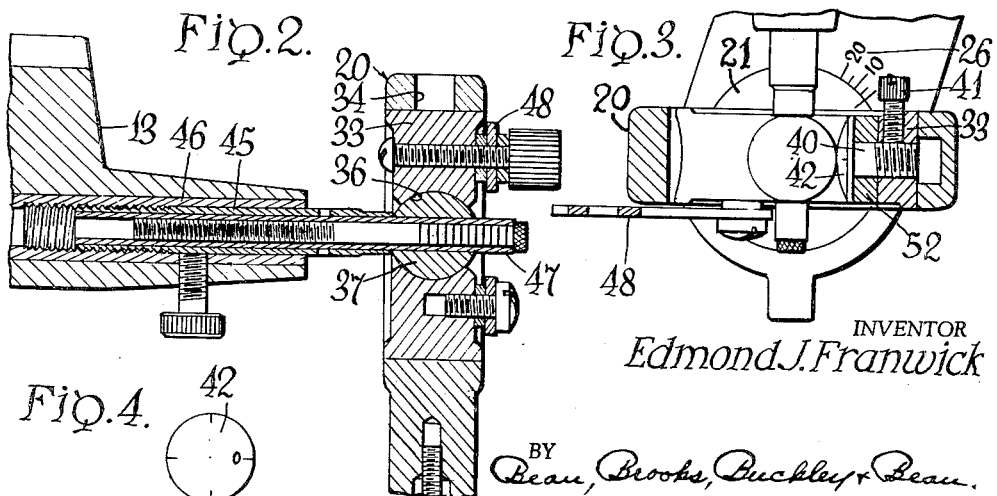

3,048,923
CONDYLAR BEARING SUPPORT AND ADJUSTING MEANS FOR DENTAL ARTICULATORS
Edmond J. Franwick, Buffalo, N.Y., assignor to Hanau Engineering Co., Inc., Buffalo, N.Y.
Filed Aug. 4, 1959, Ser. No. 831,523
8 Claims. (Cl. 32—32)

This invention relates to dental articulators and more particularly to novel condylar shaft supporting structure. Still more particularly, the present invention provides novel means for adjusting the position of the condylar shaft axis and the supporting means therefor to simulate and reproduce various physical conditions and relationships of the maxilla and mandible of a patient.

Dental articulators are well known appliances used by dentists and dental technicians for simulating the relationship of the mandible and maxilla of a patient and for reproducing their relative movements. Means are provided for supporting opposed upper and lower dentures, models, impression plates and the like in properly related positions for making impressions and for studying, testing, checking and correcting models and dentures. A typical dental articulator is illustrated in my prior Patent No. 2,237,050, dated April 1, 1941.

Speaking generally, dental articulators comprise a base for receiving a lower denture or model and a pair of posts which support a generally horizontal shaft in such manner that the ends of the shaft are adjustable to represent the condylar socket centers of a patient and reproduce their condylar movements and thus simulate the relative movements of the patient's jaws. Means are provided for supporting an upper denture or model from such shaft to react against or be compared with a lower denture or model on the base.

The posts referred to above extend vertically from the base of the device and their vertical axes are parallel with respect to each other. The aforesaid horizontal shaft is supported indirectly at its ends by the upper ends of the posts. The posts are usually referred to as condylar posts and the shaft is known as the condylar shaft. An arm or plate member which is fixed to the condylar shaft extends outwardly therefrom over the base and this arm member is usually referred to in the art as the upper member and represents the maxilla of the patient.

The present invention relates to two related adjustments of the condylar shaft supporting arrangement which are not novel in their broad functions but which effect these functions in a novel and superior manner.

In dental articulators of the general type here under consideration and illustrated in Patent No. 2,237,050, each of the pair of condylar posts has fixed to its upper end a vertical annulus or ring called the condylar head. When these condylar heads lie in parallel planes they have a common axis but certain condylar adjustments which are effected in using these dental articulators require that the axis of each condylar head be adjusted about in a horizontal plane, which adjustment is effected by rotational adjustment of the condylar post on its own vertical axis.

The present invention provides novel condylar post supporting structure and novel means for associating the same with the articulator base for rotatably adjusting the condylar post about its vertical axis and for retaining the same in accurately adjusted angular position.

Again referring to what is conventional in dental articulators of this general type, a disc is rotatably mounted concentrically within each of the condylar post heads and each such disc has a radial slot or guideway which retains and guides a ball or sphere. The aforesaid condylar shaft bears at its ends in the condylar balls of the condylar heads.

The present invention provides adjustable abutment means at the forward portion of the radial slot or guideway of each condylar disc to limit forward movement of the associated condylar ball in such slot. This adjustable stop will be referred to as the condylar ball stop and these stops cooperate with the aforesaid rotative adjustments of the condylar posts themselves to establish lateral excursions, protrusive-retrusive relationships, and centric conditions in accordance with the conditions existing in the patient's jaw structure.

The adjusting and motion defining and limiting structure of the present invention is illustrated in the accompanying drawing and the illustrated structure is described in detail in the following specification. However, it is to be understood that the structure thus illustrated and described is by way of example only and for the purpose of illustrating the underlying principles of the present invention. Various mechanical modifications may be effected without departing from the spirit of the invention and the scope thereof is not to be considered as limited to the embodiment illustrated herein nor otherwise than as defined in the appended claims.

In the drawing:

FIG. 1 is a general side elevational view of a dental articulator constructed in accordance with one form of the present invention, parts thereof being shown in cross section for added illustration;

FIG. 2 is a fragmentary cross-sectional view on the line II—II of FIG. 1 but on a larger scale;

FIG. 3 is a fragmentary cross-sectional view on the line III—III of FIG. 1, likewise on an enlarged scale; and FIG. 4 is a face view of one of the condylar ball abutment members of the form of the invention illustrated herein.

Like characters of reference denote like parts in the several figures of the drawing and it is to be understood that, in details not specifically described herein, the construction and operation may be similar to that shown in my prior Patent No. 2,237,050. Referring to FIG. 1, the numeral 10 designates a generally triangular base member and the numeral 11 designates one of a pair of condylar posts which are associated with the base adjacent to two rear corners thereof.

An incisal guide structure indicated generally by the numeral 12 is provided at the front corner of the triangular base member 10, this general arrangement being as in my prior patent or, more specifically, as illustrated and described in my companion application being filed on this date and directed particularly to the incisal guide mechanism.

An upper member 13 is hinged to the upper ends of the condylar posts 11 by means of condylar shaft means and intermediate support means, in a manner which will presently appear, and it will be understood by those skilled in the art that a lower denture or model is attached to a support 14 on base 10 and an upper denture or model is attached to a support 15 at the underside of upper member 13, the hinging or articulation of the upper member 13 being such as to reproduce relative condylar movements as between the maxilla and mandible of a dental patient.

At the upper end of each condylar post 11 there is a vertical annular formation, which shall be referred to herein as a condylar head, the same being designated 20 in the drawing. The condylar heads 20 of the two condylar posts 11 may be parallel to each other in a normal symmetrical condition but it is desired to accurately adjust either or both of the condylar posts 11 about their own vertical axes to dispose the condylar heads 20 in various oblique positions with respect to each other and with respect to the upper member 13. This vertical pivotal adjustment of the condylar posts is well known in these devices but is accomplished in the present invention in a far more effective, accurate and secure manner than heretofore.

The lower end of each condylar post 11 is provided with an annular enlargement 21 which fits accurately within a complementary recess 22 in the upper surface of base member 10. A tubular pivot post 23 is fixed at its lower end in base 10 as by means of a tight press fit therein and engages rotatably within a vertical bore 24 which extends upwardly from the bottom of each condylar post 11 almost up to the condylar head 20. By reason of the relatively long bearing engagement between pivot post 23 and bore 24, the condylar post 11 is accurately pivotally supported upon base 10 with relatively no chance for cocking or deflecting from the desired true vertical position.

A set screw 25 threaded into each condylar post 11 engages the pivot post 23 to retain desired positions of angular adjustment of the condylar post thereon and base 10 is provided with angular graduations adjacent to the annular enlargement 21 of each condylar post 11 as indicated at 26 in FIG. 3 to assist in accurate angular setting of each condylar post 11 with respect to rotative movements about its vertical pivotal axis.

Means are provided for firmly but yieldably retaining the lower end of each condylar post 11 in downward seating engagement within its associated recess 22 in base member 10. In FIG. 1 it will be noted that the upper end of tubular pivot post 23 is closed excepting for a central perforation which receives a screw 28 which threads upwardly into the condylar post 11. A compression coil spring engages between the upper end of tubular pivot post 23 and the head of screw 28 and thus urges the condylar post 11 resiliently downwardly. This resilient means is assembled and adjusted by means of a screw driver from the bottom of base 10 and the opening which gives access for such assembly and adjustment may normally be closed by a threaded plug 31.

Besides insuring secure downward seating of each condylar post 11, the resilient means just described introduces a controlled degree of rotative friction between the lower end of the condylar post and the companion surface of base member 10, so that when locking screw 25 is released, the condylar post 11 will tend to retain its angular position until it is deliberately displaced in adjusting the same.

This is of considerable assistance in setting up and adjusting the articulator, especially since these angular adjustments are usually made relative to an initial starting position and often by progressive adjustments which could not be readily effected if, upon loosening the locking device the condylar post 11 moved too freely and thus lost its initial position before adjusting movement could be effected. This is a shortcoming of condylar post adjustment arrangements of the prior art. Also, once a proper position of adjustment is reached, the resilient means will retain such position of adjustment until and during the resetting of locking screw 25.

Reference will now be had to the novel adjustable forward stop member for the aforementioned condylar balls which support the condylar shaft means and therefore the upper member 13. Excepting for this novel adjustable stop or abutment member, the structure at the upper end of each condylar post 11 is known and is substantially as illustrated in Franwick Patent No. 2,237,050.

A disc 33 is rotatably mounted in each of the condylar heads 20 and is held against axial displacement by a stud (not shown) which passes through a peripheral slot 34 in condylar head 20 and is fixed in the periphery of disc 33. A nut 35 is threaded to the outer end of this stud and when tightened holds the disc 33 against rotative adjustment in condylar head 20. Each of the discs 33 is provided with a radial slot 36 and the facing surfaces of slot 36 are arcuate in transverse cross-section to guidingly receive a condylar ball or sphere 37 which is thus retained excepting for guided movement lengthwise of slot 36.

The adjustable abutment of the present invention limits forward movement of the condylar ball 37 (to the right as viewed in FIG. 1) to an accurately adjustable degree and the abutment means per se is best illustrated in FIG. 3. A screw 40 is threaded into disc 33 from the inner end of slot 36 and may be retained in axially adjusted position by a set screw 41 which threads through the wall of disc 33 and bears against screw 40. In the present instance the head of screw 40, which is designated 42, is spherical and is adapted to abut the condylar ball 37 in tangential engagement, as clearly shown in FIG. 3.

The manner in which the upper member 13 is pivotally supported in the condylar balls 37 is not specifically involved in the present invention but is illustrated in FIG. 2. A pair of tubular members 45 are threaded into opposite ends of a sleeve 46 at the base or fulcrum portion of upper member 13 and further tubular members 47 which are pressed into sleeves 45 form journals bearing in the condylar balls 37, the adjacent outer ends of the sleeves 45 forming shoulders which engage against the condylar balls 37, as clearly illustrated in FIG. 2.

A condylar ball locking member is designated 48 in FIG. 1 and cooperates to lock the condylar balls in abutment with the head portion 42 of stop screw 40 when desired. The construction and operation of stop member 48 is substantially the same as in my aforementioned prior patent.

When set screw 41 is released, abutment screw 40 may be threaded into or out of disc 33 by finger or thumb action against the periphery of the head portion 42 of screw 40. Adjusting movements thereof in this manner are accurately calibrated by a micrometer arrangement comprising graduations 50 on disc 33 along the adjacent edge of slot 36 or guideway and further angularly spaced graduations on the head 42 of abutment screw 40 which are shown in FIG. 4. In the present instance four equally spaced angular graduations are provided on the head 42 of the abutment screw, one of the same being marked zero.

A spacer collar 52 is shown beneath head 42 of abutment screw 40 in FIG. 3 and this provides a positive forward stop for screw 40 in such position that the condylar ball 37 is concentric with the axis of condylar head 20. It is seldom that use of the present articulator requires an adjustment of screw 40 wherein the axis of ball 37 is more to the right than shown in FIGS. 1 and 3, hence, the normal use of the positive spacing collar 52.

On the rather rare occasions when an unusual condition requires the center of the condylar ball 37 to be forwardly of the center of the condylar head 20, that is to the right from the positions illustrated in FIGS. 1 and 3, spacing collar 52 may be removed to permit adjustment of abutment screw 40 to a more right-hand position, that is a more forward position.

As indicated above, the graduations 50 in conjunction with the four ninety-degree graduations on the head 42 of screw 40 provide a micrometer adjustment of the abutment screw. When the zero marking of the head of screw 40 is in the position illustrated in FIG. 4, the bottom surface of the head of the screw (the right hand or forward edge as viewed in FIG. 1) will be in line with the central or zero graduation of the graduations 50. When screw 40 is rotated one full revolution, the bottom of its head will move along to the next graduation of the group 50, and so on. Accordingly, when the screw is moved from the zero graduation of its head to the next angular head graduation, the screw will move exactly one-quarter of the distance of one of the graduations 50.

I claim:
1. In a dental articulator, a base member and a pair of spaced condylar posts extending upwardly therefrom, vertically disposed condylar discs rotatably mounted at the upper ends of said posts each having a radial slot extending inwardly from an edge thereof, a bearing member slidably guided in each of said radial slots and a condylar shaft mounted at its ends in said bearing members, an adjustable abutment for each of said bearing members having a shank portion threaded into said disc in alignment with said slot at the inner end thereof and a head portion disposed within said slot, whereby the outer radial end surface of said head portion is adapted to be abutted by the bearing member in said radial slot to limit movement of the bearing member inwardly of said radial slot, said head portion being of a diameter substantially equal to the width of said disc so as to expose diametrically opposed peripheral portions thereof for manual engagement.

2. In a dental articulator, a base member and a pair of spaced condylar posts extending upwardly therefrom, vertically disposed condylar discs rotatably mounted at the upper ends of said posts each having a radial slot extending inwardly from an edge thereof, a bearing member slidably guided in each of said radial slots and a condylar shaft mounted at its ends in said bearing members, an adjustable abutment for each of said bearing members having a shank portion threaded into said disc in alignment with said slot at the inner end thereof and a head portion disposed within said slot, whereby the outer radial end surface of said head portion is adapted to be abutted by the bearing member in said radial slot to limit movement of the bearing member inwardly of said radial slot, said head portion being of a diameter substantially equal to the width of said disc so as to expose diametrically opposed peripheral portions thereof for manual engagement, said disc having linear graduations along the edge of said slot adjacent to said abutment head portion and there being angularly spaced graduations on said head portion cooperating with said linear graduations to provide micrometer calibration of the axial position of said abutment.

3. In a dental articulator, a base member and a pair of spaced condylar posts extending upwardly therefrom, vertically disposed condylar discs rotatably mounted at the upper ends of said posts each having a radial guideway, a bearing member slidably mounted in each of said guideways and a condylar shaft mounted at its ends in said bearing members, and adjustable abutment for each of said bearing members comprising a screw having an enlarged manually engageable head portion in said guideway and a shank portion threaded into said disc in alignment with said guideway at the forward end thereof, whereby the outer radial end surface of said head portion is adapted to be abutted by the bearing member in said guideway slot to limit movement of the bearing member rearwardly of said guideway and a removable spacing collar normally disposed beneath the head portion of said abutment to limit forward movement thereof to a position wherein the bearing member engaging the same is concentric with said disc.

4. In a dental articulator, a base member and a pair of spaced parallel condylar posts extending upwardly therefrom, condylar shaft means rotatably supported between the upper portions of said condylar posts and an upper member projecting generally horizontally from said shaft means, a pair of upright tubular members each fixed at its lower end to said base member and extending upwardly within one of said condylar posts to support the same for rotation on a vertical axis, the lower ends of said condylar posts having downward seating engagement against said base member, an internal ledge adjacent to the upper end of each of said tubular members, a compression coil spring within each of said tubular members and bearing at its upper end against the internal ledge thereof, and retaining screws extending upwardly through said compression coil springs into threaded engagement with the condylar posts with their head portions in engagement with the lower ends of said springs, whereby the springs urge the condylar posts resiliently downwardly against said base member.

5. In a dental articulator, a base member and a pair of spaced parallel condylar posts extending upwardly therefrom, condylar shaft means rotatably supported between the upper portions of said condylar posts and an upper member projecting generally horizontally from said shaft means, a pair of upright tubular members each fixed at its lower end to said base member and extending upwardly within one of said condylar posts to support the same for rotation on a vertical axis, the lower ends of said condylar posts having downward seating engagement against said base member, an annular ledge within each of said tubular members, a compression coil spring within each of said tubular members and bearing at its upper end against the annular ledge thereof, and retaining screws extending upwardly through said compression coil springs into threaded engagement with the condylar post above said tubular members with their head portions in engagement with the lower ends of said springs, whereby the springs urge the condylar posts resiliently downwardly against said base member, and a set screw threaded laterally into each condylar post and adapted to bear against the tubular member therein to lock the condylar post against rotative movement.

6. In a dental articulator, a base member and a pair of spaced parallel condylar posts extending upwardly therefrom, condylar shaft means rotatably supported between the upper portions of said condylar posts and an upper member projecting generally horizontally from said shaft means, a pair of upright members each fixed at its lower end to said base member and extending upwardly within one of said condylar posts to support the same for rotation on a vertical axis, the lower ends of said condylar posts having downward seating engagement against said base member, means for selectively locking said condylar posts against rotation with respect to said base member, and resilient means acting between said upright members and said condylar posts for urging the latter resiliently downwardly against said base member.

7. In a dental articulator, a base member and a condylar post extending upwardly therefrom, an upright tubular member fixed at its lower end to said base member and extending upwardly within said condylar post to support the same for rotation on a vertical axis, the lower end of said condylar post having downward seating engagement against said base member, said tubular member having an internal ledge, a compression coil spring within said tubular member and bearing at its upper end against said internal ledge, and a retaining screw extending upwardly through said compression coil spring into threaded engagement with the condylar post above said tubular member with its head portion in engagement with the lower end of said spring, whereby the spring urges the condylar post resiliently downwardly against said base member and resiliently restrains rotative movement therebetween.

8. In a dental articulator, a base member and a condylar post extending upwardly therefrom, an upright tubular member fixed at its lower end to said base member and extending upwardly within said condylar post to support the same for rotation on a vertical axis, the lower end of said condylar post having downward seating engagement against said base member, said tubular member having an internal ledge, a compression coil spring within said tubular member and bearing at its upper end against said internal ledge, and a retaining screw extending upwardly through said compression coil spring into threaded engagement with the condylar post above said tubular member with its head portion in engagement with the lower end of said spring, whereby the spring urges the condylar post resiliently downwardly against said base member and resiliently restrains rotative movement therebetween, and a set screw threaded laterally into said condylar post and adapted to bear against said tubular member to lock the condylar post against rotative movement.

References Cited in the file of this patent
UNITED STATES PATENTS

| | | |
|---|---|---|
| 1,586,739 | Hanau | June 1, 1926 |
| 2,237,050 | Franwick | Apr. 1, 1941 |
| 2,748,481 | Glueck | June 5, 1956 |